United States Patent [19]

Cherry et al.

[11] 3,876,412

[45] Apr. 8, 1975

[54] PYROPHOSPHATE TREATMENT OF SWEET CORN

[75] Inventors: Joe H. Cherry; Herbert C. Dostal, both of West Lafayette, Ind.; Timothy J. O'Brien, Santa Monica, Calif.

[73] Assignee: Purdue Research Foundation, West Lafayette, Ind.

[22] Filed: July 27, 1973

[21] Appl. No.: 383,353

Related U.S. Application Data

[63] Continuation of Ser. No. 63,665, Aug. 13, 1970, abandoned.

[52] U.S. Cl................................. 71/65; 424/331
[51] Int. Cl................................................. A01n 5/00
[58] Field of Search.............. 71/65, 77, 68; 99/169; 424/331

[56] References Cited
UNITED STATES PATENTS

| | | | |
|---|---|---|---|
| 3,029,148 | 4/1962 | Zbonalski | 99/169 |
| 3,537,838 | 11/1970 | Oeniu | 71/77 |
| 3,600,435 | 8/1971 | Randall et al. | 71/86 X |
| 3,678,621 | 7/1972 | Reams | 71/65 X |

OTHER PUBLICATIONS

Chemical Abstracts, Vol. 57, Col. 14042(h) 1962.

Chemical Abstracts, Vol. 70, Col. 95747(F) 1969.

Chemical Abstracts, Vol. 72, Col. 2336Z, 1970.

*Primary Examiner*—James O. Thomas, Jr.
*Attorney, Agent, or Firm*—Howard J. Newby; Bruno P. Struzzi; Daniel J. Donovan

[57] ABSTRACT

Cellular constituents of plants and the products therefrom are regulated with pyrophosphate to increase the sugar content thereof. The pyrophosphate treatment according to the method of the invention is effective when applied either before or after harvest of the crops or produce.

6 Claims, No Drawings

PYROPHOSPHATE TREATMENT OF SWEET CORN

This is a continuation of application Ser. No. 63,665 filed Aug. 13, 1970 and now abandoned.

BACKGROUND OF THE INVENTION

1. Field of the Invention

This invention relates, in general, to treating plant materials and, in particular, is directed to a method for controlling the metabolism of carbohydrates in raw agricultural or horticultural products prior to, and after, harvesting. More particularly, the invention is concerned with modulating the biochemical reactions which convert sugars to polysaccharides.

2. Description of the Prior Art

The large volume and tremendous economic value of agricultural and horticultural products has created considerable incentive to determine improved methods for up-grading the quality of crops and produce. Significantly, in light of the rapid rate at which the population is increasing, there is even a more imminent incentive to improve the yield and quality of these products.

One approach toward improving crop and produce quality has been that of increasing the sugar content of the raw and processed materials. Crops and produce with a high sugar content are generally preferred by the consumer.

It is well-known that the sugar content of many crops, as for example corn, reaches its highest level prior to maturity and then, as the crop approaches maturity and greatest yield per unit of growing area, a considerable proportion of the sugar is converted to starch and other polysaccharides. Also known is the fact that sugars continue to be converted to starch immediately after harvesting and during storage of the crops and produce. The importance of determing a method for controlling the metabolism of the carbohydrates such that the sugar content of the crop or produce is at its highest level at the time the crop or produce is mature and at its highest yield, is further emphasized by the fact that it is during the few days before maturity that the rate of yield increase and the rate of sugar loss are at their highest levels.

Taking corn as an example, current theory holds that sucrose is formed in the leaf from carbon dioxide and water by photosynthesis and is then translocated from the leaf to the ear of corn. Once there, the sucrose is converted to starch via a series of complex reversible biochemical reactions, all of which reactions are catalyzed by one or more enzymes. Some of the end products — starch, orthophosphate and pyrophosphate — are believed to be produced by the action of enzyme systems which regulate the conversion of glucose-1-phosphate (Glu-1-P) to polysaccharides. An authoritative discussion of the metabolism of carbohydrates in plants which describes the conversion of sugars to starch according to the above may be found in "Plant Biochemistry" by Bonner and Varner, Academic Press N.Y. (1965) pgs. 281–282.

Although not fully understood, it has been established that several enzymes enter into the reactions in which sugars are converted to starch and the prior art has attempted to reduce the conversion of the sugars to polysaccharides by processing techniques which decrease the activities of these enzymes. Additionally, some effort has been devoted to the aspect of altering the catalytic activity of the enzymes which involve the application of hormones or "growth regulators" such as benzyladenine, gibberellic acid, cyclic adenosine, monophosphate and zeatin to reduce the catalytic activity of the enzymes promoting the conversion of sugar to starch, however, in addition to being exceptionally costly, they have met with only limited success.

Within present knowledge, the treatment of agricultural and horticultural plants and the products thereof with pyrophosphate to inhibit the conversion of sugars to polysaccharides has escaped the prior art.

SUMMARY OF THE INVENTION

Briefly, this invention resides in the discovery that pyrophosphate compounds applied to agricultural and horticultural plants and the products therefrom, will increase the sugar content of the resultant crop or produce. Important to the invention, is the finding that the pyrophosphates can be applied either before harvest, during the early post-harvest period or at both periods to effect a significant increase in the sugar level of the products as compared to control materials.

Significantly, the invention encompasses the discovery that the time of application with respect to the maturity of the crops or produce is critical for overall effectiveness and has led, as will be described hereinafter, to a method for increasing the yield of high quality agricultural and horticultural products with a significantly increased natural sugar content.

It therefore becomes an object of the invention to provide a method for improving the quality of agricultural and horticultural products.

It is another object of the instant invention to provide a method for increasing the sweetness factor of agricultural and horticultural produce without introducing undesirable side effects in the plants or product therefrom.

Since there appears to be a correlation between sweetness and textural quality of agricultural and horticultural products, it is still another object of the invention to provide a method for improving the texture of these materials.

It is a further object of the invention to provide a method for improving the yield of agricultural and horticultural products having a high sugar level.

It is still a further object of the invention to maintain the high level of sugars in harvested crops and produce during storage prior to consumption or processing.

It is yet a further object of the invention to provide produce and crops with a significantly higher natural sugar content than those heretofore attainable to compensate for the loss of sugars inherent with processing the raw crops and produce, such as by hot water blanching to terminate enzymatic activity.

Yet another object of the invention is to extend the period of time over which the crop or produce can be harvested and retain its high sugar level.

Accordingly, the foregoing and additional objects, advantages, and features of the present invention will become more fully apparent from the following detailed description of the method of treating agricultural and horticultural plants and the products therefrom by contact with water soluble pyrophosphate compounds to arrest, or at least significantly inhibit, the conversion of sucrose and monosaccharides to starch and phytoglycogen thereby effecting crops and produce with superior sweetness and textural qualities at higher yield levels than heretofore attainable.

DESCRIPTION OF THE PREFERRED EMBODIMENTS

The invention is predicated on the discovery that it is possible to retard the conversion of sugars to starch in the intact plants and/or in the harvested products by the application of pyrophosphate compounds.

Although the metabolism of carbohydrates in plants is a complex process and not completely understood, it has been established that the last in a series of enzymic catalyzed reactions for converting sugars to starch involves the conversion of glucose-1-phosphate (Glu-1-P) to starch with the concomitant release of orthophosphate and/or pyrophosphate. It is generally considered that at least two enzyme systems enter into and catalyze this conversion — phosphorylase, which catalyzes the conversion of glucose-1-phosphate to starch and orthophosphate; the second enzyme system, starch synthetase, catalyzes the conversion of gluclose-1-phosphate to starch and pyrophosphate. Since pyrophosphate is an end-product of the latter reaction, it is possible that the effect of applying additional pyrophosphate to the starch synthetase pathway is one of delaying the final reaction from proceeding to completion and thus favoring the retention of a high level of sugar for a longer time.

The foregoing has been presented by way of an explanation of the phenomenon of arresting or inhibiting the conversion of sugars to starch as carried out in the instant invention. Such explanation is only intended as a theory as to what is believed to occur, and the invention is not to be limited thereto.

The findings of the invention were unexpected. Surprisingly, it was found that only the "pyro" ($P_2O_7$) form of phosphate was effective in altering the carbohydrate metabolism to the extent of inhibiting the conversion of sugar to starch. The application of orthophosphate alone had no detectable effect on the level of sugars and when orthophosphate if employed as an adjunct in combination with pyrophosphate, the orthophosphate would not appear to influence the effect or activity of the pyrophosphate.

Since it is generally accepted that the biochemical pathways for the conversion of sugars to starch is virtually the same for all vegetable materials, it can be postulated that pyrophosphate should be applicable toward increasing the sugar content (by inhibiting the conversion of sugars to strach) of many crops and produce with varying degress of effectiveness.

The success of the method of the invention depends, to a pronounced degree, on the capability of the plant or plant product to assimilate the pyrophosphate. Therefore, the invention has been found to be effective in the treatment of such crops as corn as will be described in more detail hereinafter. However, the invention is intended to encompass the treatment of other plants and plant products such as peas and lima beans, and its scope is to be construed to extend to any plant material wherein it can be assimilated and wherein sugars are converted to starch in accordance with the generalized theory or equivalent theory referred to hereinabove.

The term "application" as used herein denotes a systemic form of application and is meant to encompass all means of incorporating the pyrophosphate compounds into the body of the plants or plant product. Foliar application, injection directly into the plant, crop, or product, and spraying with or dipping the crop or product into a solution of pyrophosphate compound are cited as examples of methods for contacting and treating the plant and/or plant product with the pyrophosphate. Also intended within the scope of applying the pyrophosphate compound according to the invention are such techniques as dusting and soil application. The type and characteristic of the plant, will, to a large extent, determine the most efficient and effective method for making the pyrophosphate available for plant assimilation which should occur, preferably, via the vascular transport system of the plant. For large quantity crops having the capability of readily assimilating the pyrophosphate, foliar application by commercial spraying techniques is anticipated as being the most practical method.

The term "pyrophosphate" as used in the description of the invention is meant to include all water soluble phosphate compounds or mixtures of such compounds which hydrolyze or ionize to yield the pyrophosphate ion. Construed to be within the meaning of the term "pyrophosphate" are the soluble sodium, potassium, calcium, magnesium, and ammonium pyrophosphate salts. Sodium pyrophosphate has been found to be preferable because of its availability, low cost, and high solubility. In any event, it is the anion $P_2O_7$ which is the effective agent and the nub of the invention is to treat the plant or plant product with a phosphate material in a manner whereby the pyrophosphate ion will be taken up by, or formed within, the host material and will influence, by its presence, the conversion of glucose-1-phosphate to starch.

Primarily from a practical viewpoint, it has been established to date that concentration ranges from about 5 ppm to about 500 ppm of sodium pyrophosphate in aqueous solution are efficacious for foliar application on corn.

In accordance with the methods of applying the pyrophosphate to the intact plant, the time of application in terms of the maturity of the plant, will have a significant effect on the extent to which the total amount of sugar is prevented from being converted to starch. Taking corn as an example, it has been determined that the most pronounced results are obtained when the pyrophosphate solution is applied as a foliar spray 10 days after the corn is at a specific state of maturity — that state of maturity when it attains approximately 50% of its total amount of "silk." The foliar spray should be applied to the extent of incipient "run-off." The optimum period (timeliness) of application of the pyrophosphate will, of course, vary with the kind of plant, the variety of the plant, the extent to which it is desired to have a sweeter product, weather conditions, soil conditions, extent and type of fertilization, and possibly other factors. By standard refractive index measurements, it is considered within the ken of the average agronomist to establish the optimal period of application to obtain the desired sugar level in any particular crop.

The treatment of agricultural and horticultural plants with pyrophosphate to reduce the rate at which sugars are converted to starch as the plant approaches maturity can be effective toward increasing the yield of high quality produce per unit growing area. Perhaps the most important quality loss in sweet corn, peas, lima beans and other vegetables, is the loss of sweetness that occurs when the unharvested vegetables are left on the plant and not picked at the time of highest sugar level. It is, however, during this period of rapid conversion of sugar to starch that a pronounced weight and volume gain takes place in the produce from the plant — an increase in yield which would be highly desirable if it were not for the loss in sweetness of the produce. Therefore, in addition to improving the sweetness, the method of the invention can be used to advantage to improve the yield and also, make more practical the harvesting of crops over a longer period of time without the danger of a reduction in quality from excessive conversion of sugars to starch. The terms "sugar," "sugars," and "natural sugar" used throughout this specification are intended to mean sucrose, fructose, glucose and all other naturally occurring plant sugars which are subject to conversion to starch and other polysaccharides.

Equally important, the method of the invention can be employed to inhibit the conversion of sucrose and monosaccharides to starch which normally occurs at a significant rate in the harvested crop or produce during storage. It is well-known that sweet corn begins immediately to lose sweetness upon being picked and the loss of sugars continues throughout storage. Refrigeration can, to a limited extent, slow down the enzymic reactions which cause these changes, but this is an exceptionally costly method, especially for the treatment of high volume crops prior to blanching or other processing.

It has been found that by injecting the harvested produce with an aqueous solution of pyrophosphate, or preferably, immersing the product in a dilute solution of pyrophosphate soon after harvesting affords a means of incorporating the pyrophosphate into the plant product wherein it will delay the rate of conversion of sugar to starch for a few days or until the produce is further processed as by hot water blanching. Since conventional blanching of produce with hot water in order to limit enzyme activity also leaches soluble sugars, pyrophosphate treatment of the raw produce prior to blanching, by increasing the sugar content over that normally occurring, should effect a higher level of sweetness in the product after blanching.

In order that the present invention may be more clearly understood, reference will now be had to the following examples which illustrate the various facets of the invention. It should be understood, however, that these examples are merely meant to be iIllustrative and the invention is not to be limited thereto.

EXAMPLE I

Injection of a few milliliters of a $10^{-2}$ molar aqueous solution of tetrasodium pyrophosphate into the base of the attached (on the plant) ears of field grown sweet corn 10 days prior to harvest produced the following average results at harvest:

| SAMPLE | REDUCING SUGARS (% DRY WEIGHT) |
| --- | --- |
| Control | 1.6 |
| Pyrophosphate Treated | 2.0 |

EXAMPLE II

This example illustrates the application of the invention toward inhibiting the conversion of sucrose to starch in the attached (on the plant) ear of sweet corn in a manner similar to that illustrated in Example I.

Using sweet corn grown in the greenhouse, the effect of tetrasodium pyrophosphate on ears of intact plants was evaluated. Treatments were applied into the ears 48 hours before harvesting (20 days after controlled pollination) by injecting a solution of tetrasodium pyrophosphate into the corn ears with a hypodermic needle.

Average results are shown below:

PYROPHOSPHATE EFFECT ON SUGAR LEVEL IN SWEET CORN

| TREATMENT | TIME IN HOURS | PERCENT BY DRY WEIGHT | |
| --- | --- | --- | --- |
| | | REDUCING SUGARS | SUCROSE |
| Control | 0 | 8.6 | 18.2 |
| | 24 | 6.1 | 10.6 |
| Pyrophosphate Treated | 0 | 9.4 | 16.5 |
| | 24 | 10.8 | 14.5 |

The above data (Examples I & II) indicate injecting pyrophosphate into the ears of corn while on the plant was effective in retarding the conversion of sugars to starch.

EXAMPLE III

A dilute (less than 1%) solution of tetrasodium pyrophosphate was injected into the top end of an ear of corn detached from the plant. The treated ear of corn and a control were analyzed for sucrose content by colorimetric technique. The analytical results are as follows:

| | SUCROSE (PERCENT BY DRY WEIGHT) | | |
| --- | --- | --- | --- |
| | TIME IN HOURS | | |
| | 0 | 24 | 36 |
| Control | 4.6 | 3.0 | 2.2 |
| Pyrophosphate Treated | 3.7 | 5.2 | 5.0 |

EXAMPLE IV

Example III was repeated including the injection of a similarly diluted solution of trisodium phosphate (orthophosphate) in the top end of an ear of corn to compare the effect of pyrophosphate and orthophosphate treatment with a control on inhibiting the conversion of sucrose to starch during subsequent storage. Analytical results are as follows:

| | SUCROSE (PERCENT BY DRY WEIGHT) | | |
| --- | --- | --- | --- |
| | TIME IN HOURS | | |
| | 0 | 24 | 36 |
| Control | 4.0 | 2.8 | 1.8 |
| Pyrophosphate Treated | 4.8 | 5.4 | 2.8 |
| Orthophosphate Treated | 4.6 | 3.0 | 1.0 |

The data in Example III & IV show that the pyrophosphate treatment of corn detached from the plant is effective in retarding the conversion of sucrose to starch whereas the orthophosphate treatment is not indicated to have this effect.

EXAMPLE V

Sweet corn ears were purchased from a local grocery and treated by immersing and spraying in an aqueous solution of tetrasodium pyrophosphate. The corn was then held in dark storage at room temperature. Treatment variables and corresponding results at 0, 24 and 48 hours storage are tabulated below:

EFFECT OF PYROPHOSPHATE ON TOTAL SUGARS IN SWEET CORN (IMMERSION TREATMENT, SPRAYING TREATMENT)

| TREATMENT OF CORN | TOTAL SUGARS (PERCENT DRY WGT.) TIME IN HOURS | | |
|---|---|---|---|
| | 0 | 24 | 48 |
| 1. Control (5 Min. Immersion in Water). | 13.8 | 8.1 | 5.6 |
| 2. Immersed in 10 millimolar pyrophosphate for 5 Min. | 11.8 | 8.2 | 6.9 |
| 3. Control -II (10 Min. immersion in Water). | 9.2 | 6.4 | 3.9 |
| 4. Immersed in 10 millimolar pyrophosphate for 10 Min. | 11.5 | 7.0 | 5.6 |
| 5. Sprayed with 10 millimolar pyrophosphate until "run-off". | 16.6 | 7.8 | 6.8 |

The overall results of the above treatment indicates immersion and spraying treatments of corn detached from the plant is effective in reducing the conversion of the total sugar content to starch.

EXAMPLE VI

Greenhouse corn was treated with tetrasodium pyrophosphate at several concentrations in aqueous solution by injecting the pyrophosphate solution into the stalk of the plant at the point of ear attachment. The treatments were applied 20 days after pollination and 2 days befoe harvesting. The detached ears were analyzed for sucrose content at 0, 24 and 36 hours of storage. The analytical results are as follows:

| PYROPHOSPHATE CONC. (MILLIMOLAR) | SUCROSE (PERCENT DRY WGT.) TIME IN HOURS | | |
|---|---|---|---|
| | 0 | 24 | 36 |
| 0 | 16.5 | 6.5 | 6.0 |
| 1.0 | 18.0 | 8.0 | 6.5 |
| 2.5 | 16.5 | 14.0 | 7.0 |
| 5.0 | 18.5 | 17.0 | 9.0 |

These data show pyrophosphate is effective in reducing the conversion of sugar to starch and indicate there is a dose response but no optimum has been determined.

EXAMPLE VII

Using the above data as guide lines, field trials were conducted to substantiate the preliminary information. Aqueous solutions of tetrasodium pyrophosphate at three (3) concentrations (5, 50, & 500 ppm) of each were applied as a foliar spray to "Jubilee" variety corn. Such variables as time of application with respect to maturity of the corn (approximately 10 and 20 days prior to harvest) were built into the design of the experiment.

All of the harvested corn was cut from the cob and quick frozen within a matter of hours after harvesting. The corn was then stored at about minus 30°F. until analyzed for sucrose and reducing sugars by conventional colorimetric techniques.

EFFECT OF FOLIAR APPLICATION (10 DAYS BEFORE HARVEST) OF PYROPHOSPHATE ON SUGARS IN SWEET CORN

| PYROPHOSPHATE CONC. (ppm) | REDUCING SUGARS % Dry Wgt. | SUCROSE % Dry Wgt. |
|---|---|---|
| 0 | 3.7 | 9.2 |
| 5 | 5.7 | 14.1 |
| 50 | 5.5 | 11.8 |
| 500 | 5.3 | 13.7 |

The data show tetrasodim pyrophosphate to have an effect on the sugar level of sweet corn when applied as a foliar spray at all three (3) concentrations. The effect of pyrophosphate sprayed on similar corn in a like manner at approximately 20 days before harvest was shown not to be as effective, indicating time of application with respect to maturity to be a critical factor.

As shown, the pyrophosphate treatment can also increase the level of reducing sugars (mainly glucose and fructose) in the corn.

Informal taste test panel results indicated a preference for the corn containng higher sugar levels.

The above data is representative. Statistical analysis of all of the data accumulated from the field run tests indicates that:

1. At the 95% confidence limits, the predicted increase in reducing sugars for sweet corn treated under optimum conditions is about 24 to 74%.
2. At the 95 % confidence limits, the predicted increase in sucrose in sweet corn treated under the same optimum conditions is 10 to 56%.

While the foregoing has illustrated and described what is now contemplated to be the best mode of carrying out the invention the procedures, preparations and materials, are of course, subject to modification without departing from the spirit and scope of the invention. Without further analyses, the foregoing will so fully reveal the gist of the present invention that others can, by applying current knowledge, readily adapt it for various applications without omitting features that, from the standpoint of prior art, fairly constitute essential characteristics of the general and specific aspect of the invention; the scope of which are defined by the appended claims.

What is claimed and desired to be secured by Letters Patents is:

1. The method of treating sweet corn on the cob which consists of applying to the corn on the cob an aqueous solution of sodium pyrophosphate in an amount effective to inhibit the conversion of the naturally occuring sugars in the corn kernels to starch.

2. The method of claim 1 wherein the aqueous solution of sodium pyrophosphate is applied to the corn on the cob within the period of about 10 days prior to harvesting the corn.

3. The method of claim 1 wherein the aqueous solution of sodium pyrophosphate is applied to the sweet corn on the cob directly after the corn is harvested from the plant.

4. The method of claim 1 wherein the concentration of the sodium pyrophosphate in aqueous solution is about 10 millimolar.

5. The method of treating a sweet corn plant which consists of applying as a foliar spray to the plant to the extent of incipient run-off a dilue aqueous solution of sodium pyrophosphate during the time period when the sugar content of the corn is at, or near, its highest level, whereby the corn plant assimilates an amount of pyrophosphate ion effective to inhibit the conversion of the plant sugars to starch.

6. The method of claim 5 wherein the foliar spray has a concentration of sodium pyrophosphate ranging from about 5 parts per million and the foliar spray is applied 10 days after the corn plant has matured to the extent of attaining approximately 50% of its attainable silk.

* * * * *

UNITED STATES PATENT OFFICE
CERTIFICATE OF CORRECTION

PATENT NO. : 3,876,412
DATED : April 8, 1975
INVENTOR(S) : Joe H. Cherry; Herbert C. Dostal and Timothy J. O'Brien It is certified that error appears in the above-identified patent and that said Letters Patent are hereby corrected as shown below:

Column 10 - line 7 after "million" insert

-- to about 500 parts per million --

Signed and sealed this 15th day of July 1975.

(SEAL)
Attest:

RUTH C. MASON
Attesting Officer

C. MARSHALL DANN
Commissioner of Patents
and Trademarks